United States Patent
Schwarzberger et al.

(10) Patent No.: US 10,714,795 B2
(45) Date of Patent: Jul. 14, 2020

(54) MONITORING BATTERY CELL INTERNAL PRESSURE

(71) Applicant: Infineon Technologies AG, Neubiberg (DE)

(72) Inventors: Guenter Schwarzberger, Reitmehring (DE); Jens Barrenscheen, Munich (DE); Goran Keser, Munich (DE); Christopher Roemmelmayer, Munich (DE)

(73) Assignee: Infineon Technologies AG, Neubiberg (DE)

(*) Notice: Subject to any disclaimer, the term of this patent is extended or adjusted under 35 U.S.C. 154(b) by 579 days.

(21) Appl. No.: 15/583,635

(22) Filed: May 1, 2017

(65) Prior Publication Data

US 2018/0316067 A1    Nov. 1, 2018

(51) Int. Cl.
*H01M 10/48* (2006.01)
*H01M 10/44* (2006.01)
(Continued)

(52) U.S. Cl.
CPC ........... *H01M 10/48* (2013.01); *H01M 2/024* (2013.01); *H01M 2/345* (2013.01); *H01M 10/425* (2013.01); *H01M 10/4285* (2013.01); *H01M 10/445* (2013.01); *H01M 10/448* (2013.01); *H01M 2/0217* (2013.01); *H01M 2/0285* (2013.01); *H01M 2/1241* (2013.01); *H01M 2010/4271* (2013.01); *H01M 2010/4278* (2013.01); *H01M 2010/4292* (2013.01); *H01M 2200/20* (2013.01); *H01M 2220/20* (2013.01)

(58) Field of Classification Search
CPC ............. H01M 10/425; H01M 10/445; H01M 10/448; H01M 2/0217; H01M 2/1241; H01M 2200/20; H01M 2/0285; H01M 2220/20; H01M 2010/4271; H01M 2010/4278; H01M 2010/4292; H01M 10/48; H01M 2/024; H01M 2/345; H01M 10/4285; G01L 1/14
USPC .......................................................... 320/147
See application file for complete search history.

(56) References Cited

U.S. PATENT DOCUMENTS

| | | | | |
|---|---|---|---|---|
| 4,476,200 A | * | 10/1984 | Markin ............... | H01M 2/1241 429/56 |
| 4,690,667 A | * | 9/1987 | Domke ................ | B65B 61/186 383/103 |

(Continued)

OTHER PUBLICATIONS

"Capacitance Sensors:: MTI Instruments," accessed on Aug. 4, 2016, from http://www.mtiinstruments.com/technology-principles/capacitance-sensors, 14 pp.

(Continued)

*Primary Examiner* — M Baye Diao
(74) *Attorney, Agent, or Firm* — Shumaker & Sieffert, P.A.

(57) ABSTRACT

Techniques for monitoring an internal pressure of a battery cell, whereby a membrane that is part of an outer shell of the battery cell is used as an element of capacitive-based or inductive-based sensor circuitry in order to measure a change of capacitance or inductance under deformation of the membrane from the internal pressure of the battery cell. The change of capacitance or inductance may in turn be used to derive a value for the internal pressure of the battery cell.

20 Claims, 17 Drawing Sheets

(51) Int. Cl.
  *H01M 10/42* (2006.01)
  *H01M 2/34* (2006.01)
  *H01M 2/02* (2006.01)
  *H01M 2/12* (2006.01)

(56) References Cited

U.S. PATENT DOCUMENTS

| | | | | |
|---|---|---|---|---|
| 5,906,219 | A * | 5/1999 | Lavery | F16K 17/0493 137/461 |
| 6,866,057 | B1 * | 3/2005 | Buehrle, II | F16K 17/383 137/74 |
| 7,614,308 | B2 * | 11/2009 | Berner | G01L 9/0075 361/283.4 |
| 8,193,770 | B2 * | 6/2012 | Zheng | H01M 2/206 320/116 |
| 8,276,695 | B2 * | 10/2012 | Han | H01M 2/04 180/65.31 |
| 8,420,254 | B2 * | 4/2013 | Zhu | H01M 2/04 429/175 |
| 8,539,627 | B2 * | 9/2013 | Terawaki | A61G 7/05769 5/713 |
| 9,231,416 | B2 * | 1/2016 | Kim | H01M 10/482 |
| 9,276,297 | B2 * | 3/2016 | Hald | H01M 10/48 |
| 9,658,292 | B2 * | 5/2017 | Roumi | H01M 10/4257 |
| 9,692,860 | B2 * | 6/2017 | Lee | H04M 1/0202 |
| 9,733,136 | B2 * | 8/2017 | Seitz | A61B 5/00 |
| 9,748,611 | B2 * | 8/2017 | Elian | H01M 10/48 |
| 9,865,419 | B2 * | 1/2018 | Blackmon | H01H 50/12 |
| 10,420,374 | B2 * | 9/2019 | Liu | A24F 47/008 |
| 2004/0166385 | A1 * | 8/2004 | Morse | H01M 8/04216 429/421 |
| 2008/0097704 | A1 * | 4/2008 | Notten | H01M 10/425 702/42 |
| 2009/0053586 | A1 * | 2/2009 | Fredriksson | H01M 2/08 429/57 |
| 2009/0159354 | A1 * | 6/2009 | Jiang | H01M 2/206 180/68.5 |
| 2013/0093383 | A1 * | 4/2013 | Kim | H02J 7/00719 320/107 |
| 2014/0079964 | A1 * | 3/2014 | Gless | H01M 2/1072 429/53 |
| 2014/0170446 | A1 * | 6/2014 | Elian | G01M 3/227 429/61 |
| 2015/0004451 | A1 * | 1/2015 | Elian | H01M 10/48 429/90 |
| 2015/0132614 | A1 * | 5/2015 | Elian | H01M 10/48 429/50 |
| 2015/0226810 | A1 | 8/2015 | Elian et al. | |
| 2015/0301113 | A1 * | 10/2015 | Sims | H04Q 9/00 324/426 |
| 2015/0332574 | A1 * | 11/2015 | Lee | H04M 1/0202 340/665 |
| 2016/0036098 | A1 * | 2/2016 | Washiro | H02J 13/0003 429/50 |
| 2016/0200564 | A1 * | 7/2016 | Pustan | B81B 3/0081 257/467 |
| 2017/0331157 | A1 * | 11/2017 | Newman | H01M 10/425 |
| 2018/0040926 | A1 * | 2/2018 | Keser | H01M 10/0413 |
| 2018/0047972 | A1 * | 2/2018 | Chung | H01M 2/0237 |

OTHER PUBLICATIONS

"Capacitive Sensors High Resolution Position Sensing," Microsense, accessed on Aug. 4, 2016, from http://www.microsense.net/products-position-sensors.htm, 4 pp.

"Capacitive Sensor Operation and Optimization; Capacitor Sensor, Capacitance Probe, Capacitance Sensor," Lion Precision, accessed on Aug. 4, 2016, from http://www.lionprecision.com/tech-library/technotes/cap-0020-sensor-theory.html, 9 pp.

"Capacitance Sensor, Measuring Nanometer Displacement, Nano-Metrology, Capacitive Guage, Metrology, by PL," accessed on Aug. 4, 2016, from http://www.capacitance-sensors.com/index.htm#Tutorial, 31 pp.

U.S. Appl. No. 15/229,953, filed by Goran Keser, filed Aug. 5, 2016.

\* cited by examiner

MONITORING BATTERY CELL INTERNAL PRESSURE

TECHNICAL FIELD

The present disclosure relates to battery cells, and more specifically to monitoring an internal pressure of battery cells.

BACKGROUND

Internal pressure of lithium-ion battery cells, for example, should be kept within safe operating limits at all times in order to avoid possibly hazardous situations, such as fire or explosion. Due to the aggressive chemistry within lithium-ion battery cells, however, it is not feasible to implement a pressure monitoring sensor inside the battery cell itself. Therefore, the internal pressure of such battery cells cannot be monitored directly.

SUMMARY

The present disclosure is directed to techniques for monitoring an internal pressure of a battery cell, whereby a membrane that is part of an outer shell of the battery cell is used as an element of a capacitive-based or inductive-based sensor circuitry in order to measure a change of capacitance or inductance derived from the deformation of the membrane due to the internal pressure of the battery cell. The change of capacitance or inductance may in turn be used to derive a value for the internal pressure of the battery cell.

As an example implementation, a device may include or comprise a sensing arrangement configured to be mounted to a battery cell that comprises a housing having an opening and a membrane that is deformable and configured to hermetically seal the opening of the housing of the battery cell, wherein the sensing arrangement is further configured to sense a deformation of the membrane as a result of a pressure within the housing of the battery cell being exerted on the membrane, and wherein the device is configured to output a signal indicative of the pressure within the housing of the battery cell to a battery management system, the signal being based on the deformation of the membrane.

As another example implementation, a battery cell arrangement may include or comprise a battery cell comprising a housing having an opening and a membrane that is deformable and configured to hermetically seal the opening of the housing, and a sensing arrangement arranged at a predetermined distance from and adjacent to the membrane of the housing, wherein the sensing arrangement is configured to sense a deformation of the membrane as a result of a pressure within the housing being exerted on the membrane, and wherein the battery cell arrangement is configured to output a signal indicative of the pressure within the housing of the battery cell to a battery management system, the signal being based on the deformation of the membrane.

As another example implementation, a battery management system may include or comprise a receiving unit configured to receive, from a battery cell arrangement, a signal indicative of an internal pressure of a battery cell, and a processing unit configured to determine a value of the internal pressure of the battery cell based on the signal received from the battery cell arrangement, and to generate a command signal to electrically decouple the battery cell from a load when the value of the internal pressure of the battery cell is greater than or equal to a threshold pressure value.

Although not so limited, an appreciation of the various aspects of the present disclosure may be gained from the discussion of the detailed description provided in connection with the drawings.

DETAILED DESCRIPTION

The present disclosure is directed to techniques for monitoring an internal pressure of a battery cell, whereby a membrane that is part of an outer shell of the battery cell is used as an element of a capacitive-based or inductive-based sensor circuitry in order to measure a change of capacitance or inductance derived from the deformation of the membrane due to the internal pressure of the battery cell. The change of capacitance or inductance may in turn be used to derive a value for the internal pressure of the battery cell. Such an implementation is advantageous in many respects. For example, the sensor circuitry as contemplated throughout is external the battery cell and therefore is not exposed to aggressive chemicals inside the battery cell. As another example, once monitoring electronics coupled to the sensor circuitry detect(s) overpressure within the battery cell, the monitoring electronics (possibly incorporated within a battery management system) may interrupt the current flow through the battery cell by opening a main battery switch, thereby decoupling the battery cell from a load. As such, a CID (Current Interrupt Device) that is leveraged in typical or conventional implementations may be removed or omitted. Although, importantly, the invention of the present disclosure is not so limited (interrupt switch current flow) as another use case would be to improve state of health prediction, as mentioned below. Still another use case would be the derating (lowering) of the load or charging current in order to limit additional pressure build up and therefore to prevent the disconnection of the battery. Additionally, or alternatively, since the battery management system is aware of the overpressure, the battery management system may trigger an action such as notifying a driver of a vehicle of the overpressure. Further, it is contemplated that the safety level of the battery cell may be improved due to improved diagnosis or diagnostic capabilities that flow from the features or aspects of the present disclosure. Other advantages flow from the techniques of the present disclosure as discussed in connection with the drawings.

Figure 1:
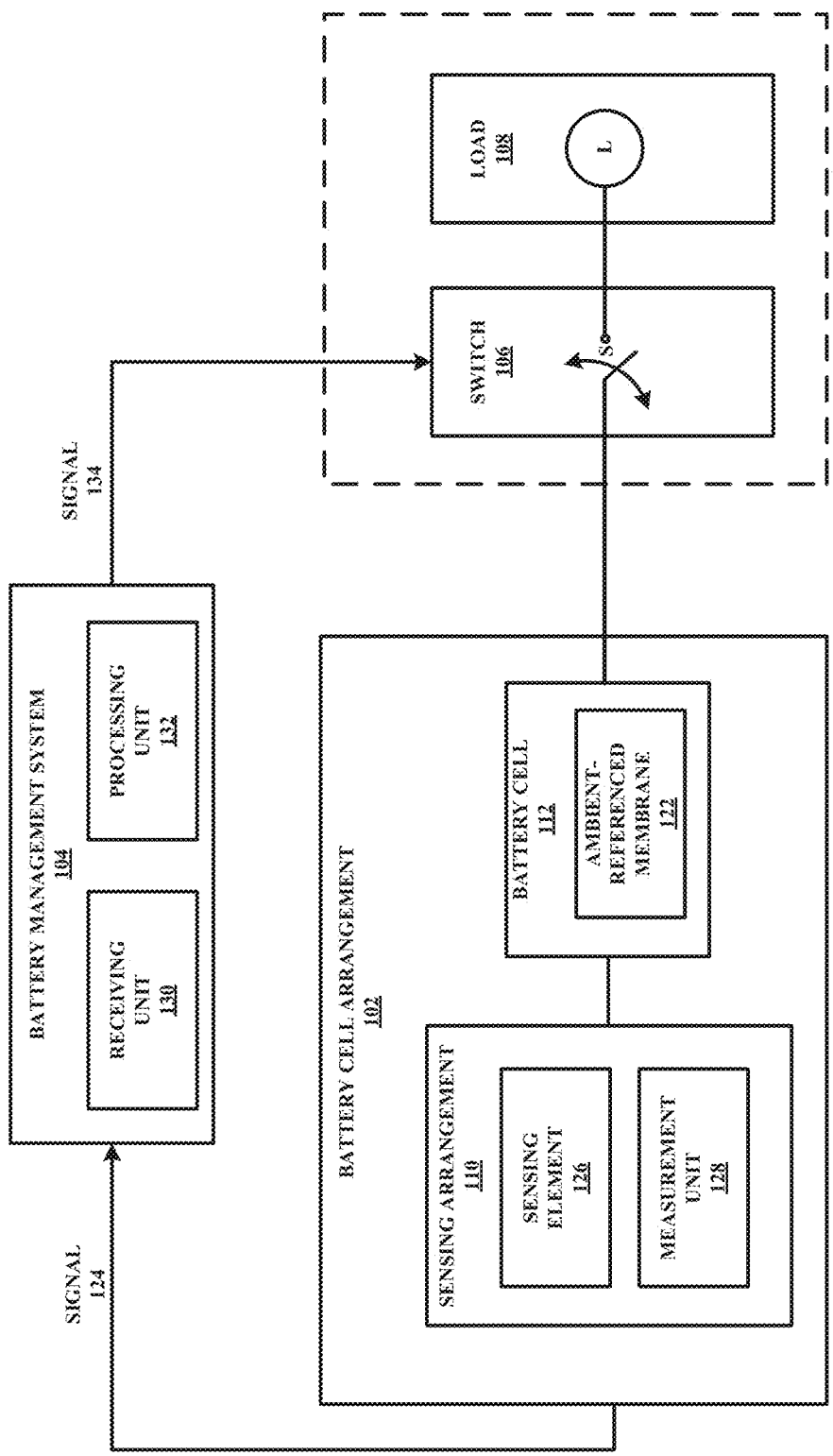
FIG. 1 shows a block diagram of a system for monitoring an internal pressure of a battery cell according to the disclosure.
Figure 2:
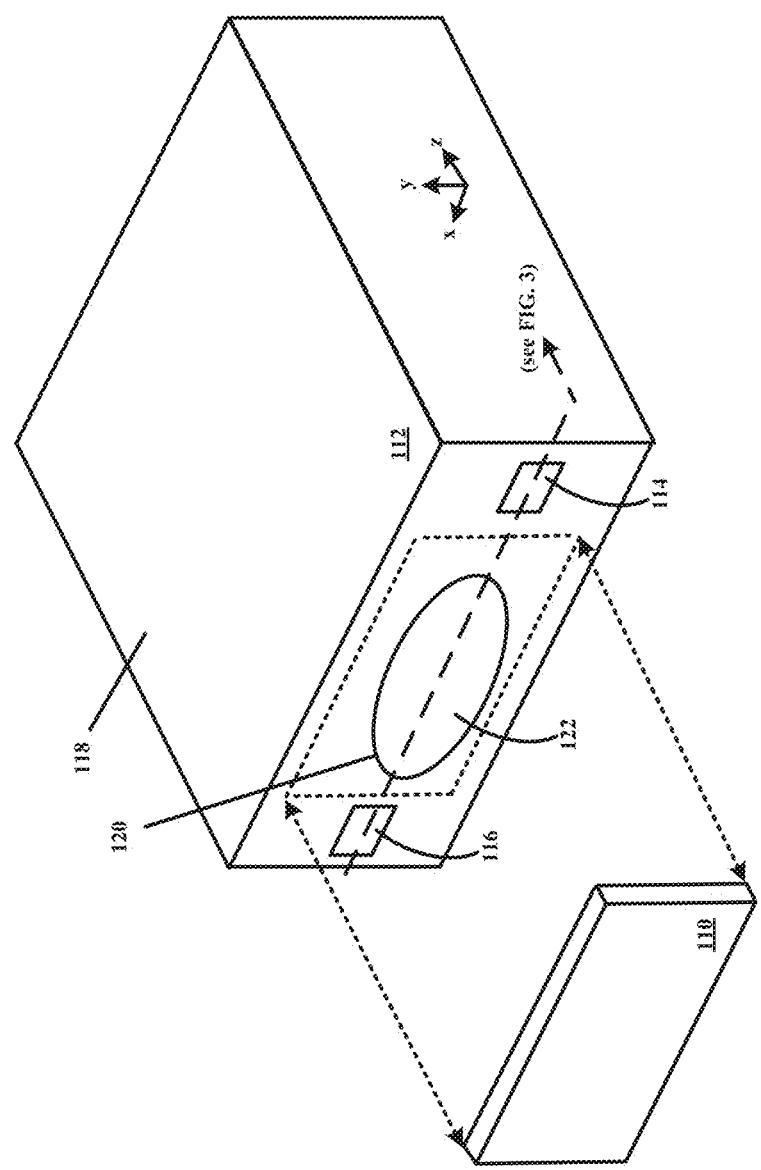
FIG. 2 shows a schematic diagram of a battery cell arrangement of FIG. 1.

For example, FIG. 1 shows a block diagram of a system 100 for monitoring an internal pressure of a battery cell according to the disclosure. In this example, system 100 comprises a battery cell arrangement 102 (equivalently, a device) and a battery management system 104, and FIG. 2 shows a schematic diagram of battery cell arrangement 102 in example detail. Only optionally, as indicated by intermittent line in FIG. 1, system 100 includes at least one switch 106 and at least one load 108. In practice, a sensing arrangement 110 of battery cell arrangement 102 is configured to be mounted to a battery cell 112 of battery cell arrangement 102 between respective terminals 114, 116 of battery cell 112 (as an example only, as battery cell arrangement 102 could be mounted anywhere on the outside of battery cell 112), whereby battery cell 112 comprises a housing 118 having an opening 120 and a membrane 122 that is deformable and configured to hermetically seal opening 120 of housing 118 of battery cell 112. Sensing arrangement 110 is further configured to sense a deformation or deflection of membrane 122 as a result of a pressure (internal cell pressure) within housing 118 of battery cell 112 being exerted on membrane 122, and battery cell arrangement 102 is configured to output a signal 124 that is indicative of the pressure within housing 118 of battery cell 112 to battery management system 104, signal 124 being based on the deformation of membrane 122.

Additionally, a sensing element 126 of sensing arrangement 110 is configured to be arranged adjacent to membrane 122 of housing 118 of battery cell 112, and a measurement unit 128 of sensing arrangement 110 is configured to measure a physical parameter of sensing element 126 that is dependent on the deformation of membrane 122, for battery cell arrangement 102 to output signal 124. Additionally, a receiving unit 130 of battery management system 104 is configured to receive, from battery cell arrangement 102, signal 124 that is indicative of an internal pressure of battery cell 112, and a processing unit 132 of battery management system 104 is configured to determine a value of the internal pressure of battery cell 112 based on signal 124, and to generate a command signal 134 to electrically decouple battery cell 112 from load 108, by controlling state of switch 106, when the value of the internal pressure of battery cell 112 is greater than or equal to a threshold pressure value. It is in this manner that the present disclosure is directed to techniques for monitoring battery cell internal pressure whereby a membrane that is part of an outer shell of the battery cell is used as an element of capacitive-based or inductive-based sensor circuitry in order to measure a change of capacitance or inductance under deformation of the membrane from internal pressure of the battery cell. The change of capacitance or inductance may in turn be used to derive a value for the internal pressure of the battery cell.

Figure 3:
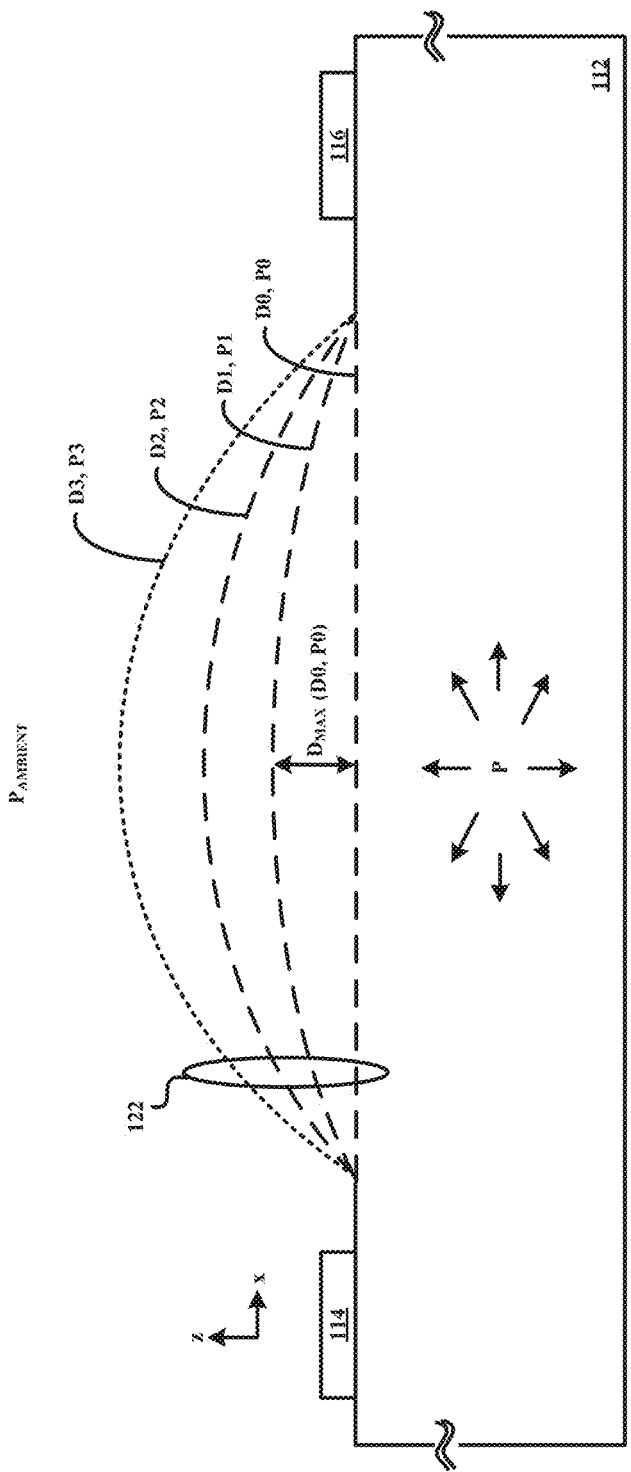
FIG. 3 shows a cross-section of a battery cell of FIG. 2 and deformation of a membrane of the battery cell over a number of different values of internal cell pressure.
Figure 4:
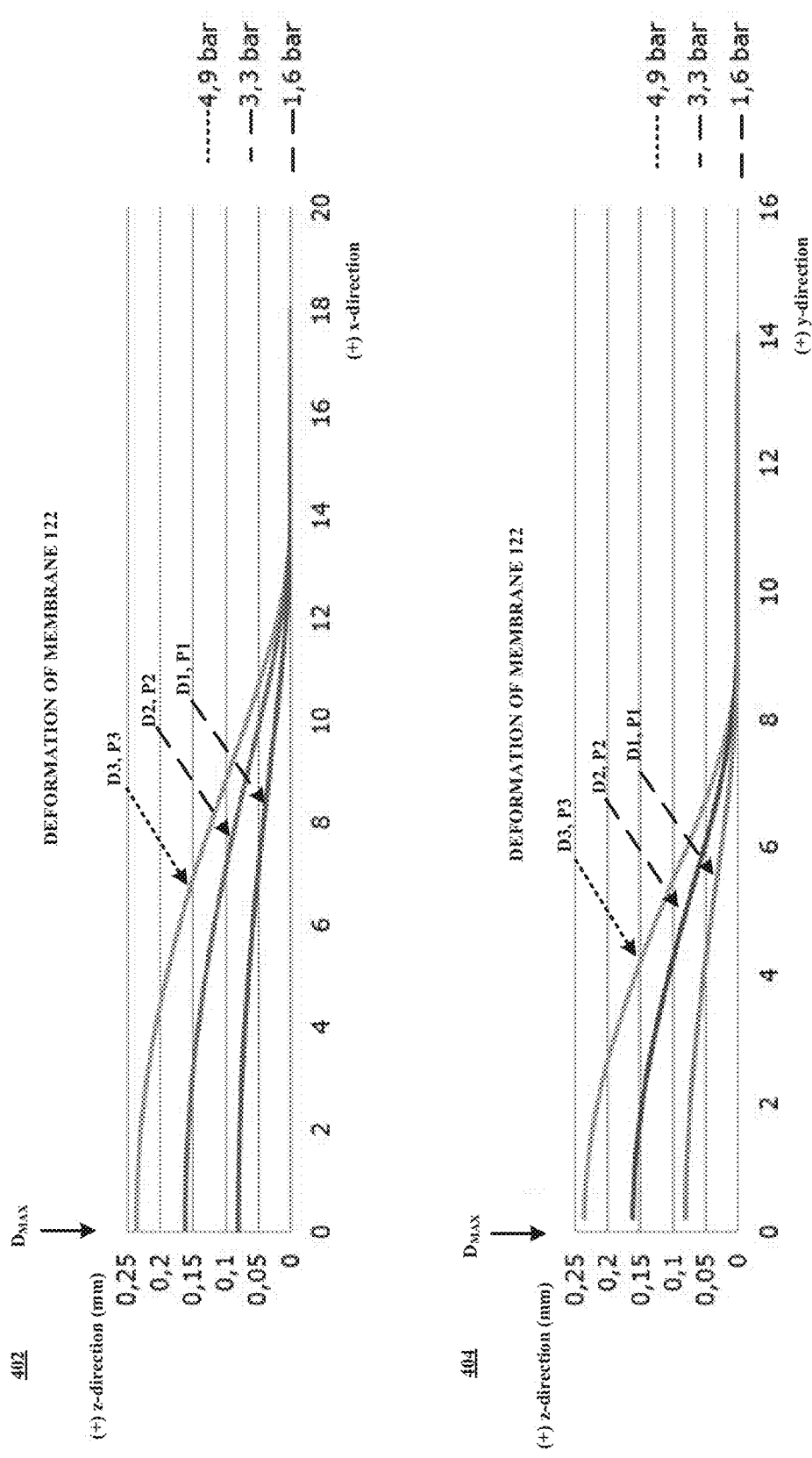
FIG. 4 shows example plots of deformation of an embodiment of a membrane according to FIG. 3 over the number of different values of internal cell pressure.

More specifically, sensing element 126 is configured to sense a deformation of membrane 122 as a result of a pressure within housing 118 of battery cell 112 being exerted on membrane 122. An example of deformation of membrane 122 is illustrated in FIGS. 3-4. In particular, FIG. 3 shows a cross-section of battery cell 112 of FIG. 2 and deformation of membrane 122 of battery cell 112 over a number of different values of internal cell pressure, and FIG. 4 shows plots 402, 404 of deformation of membrane 122 of FIG. 3 over the number of different values of internal cell pressure. In this example, the abscissa of plot 402 corresponds to length along the x-axis of membrane 122 as shown in FIG. 2, and the abscissa of plot 404 corresponds to length along the y-axis of membrane 122 as shown in FIG. 2. With reference to FIG. 4 alone, deformation D of membrane 122 in general increases with increasing internal cell pressure P (D0, P0<D1, P<D2, P3<D3, P4) as measured with respect to ambient pressure $P_{AMBIENT}$, wherein at zero (0) internal cell pressure the deformation of membrane 122 is negligible unless membrane 122 has experienced plastic deformation, discussed below in connection with at least FIG. 17. Since membrane 122 deforms or deflects under load from internal cell pressure, it is thus contemplated that membrane 122 may be used as an element of capacitive-based or inductive-based sensor circuitry in order to measure a change of capacitance or inductance under deformation of membrane 122 from internal pressure of battery cell 112. The change of capacitance or inductance may in turn be used to derive a value for the internal pressure of battery cell 112. Operating principle of such sensor circuitry as contemplated is discussed in connection with at least FIGS. 5-7.

Figure 5:
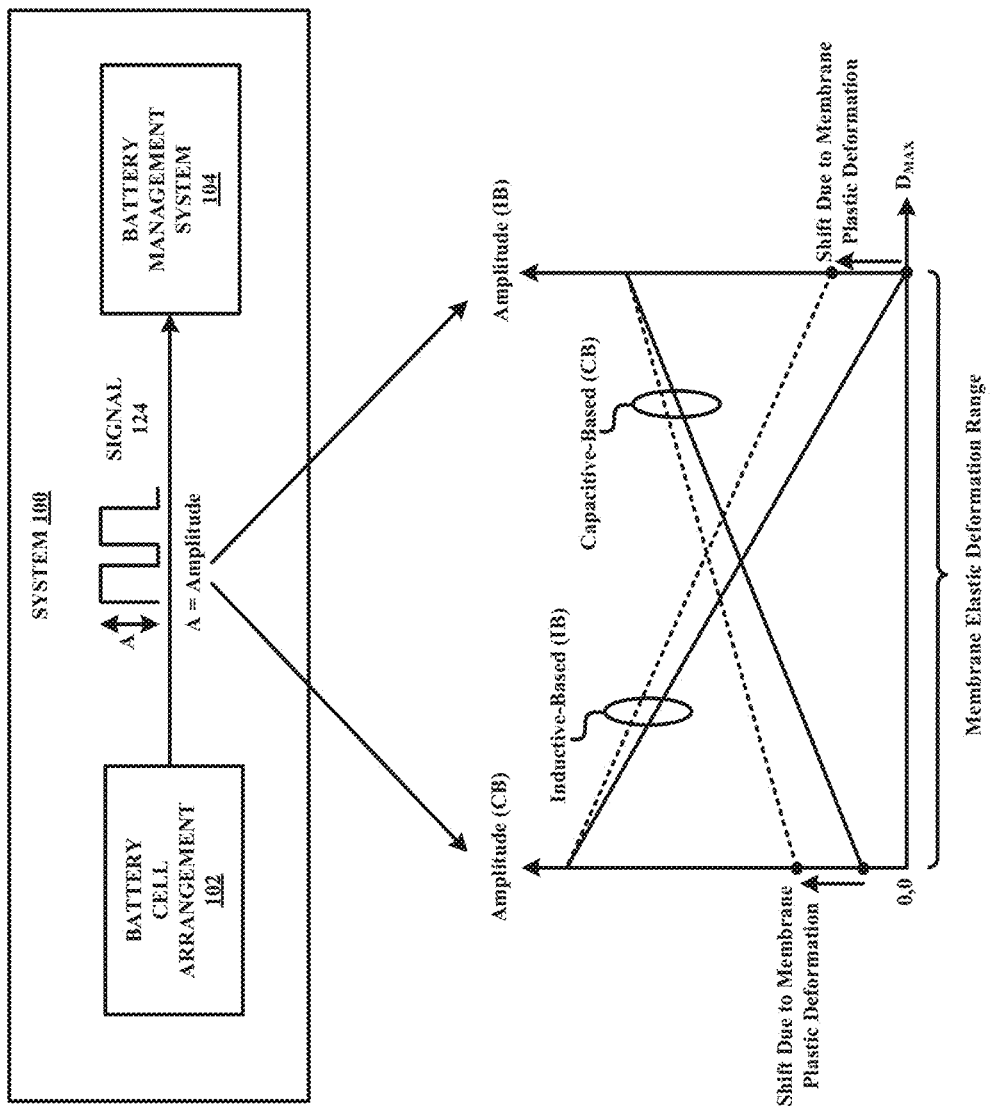
FIG. 5 shows the system of FIG. 1, whereby a sensing element is configured as a proximity sensor according to an example implementation.
Figure 6:
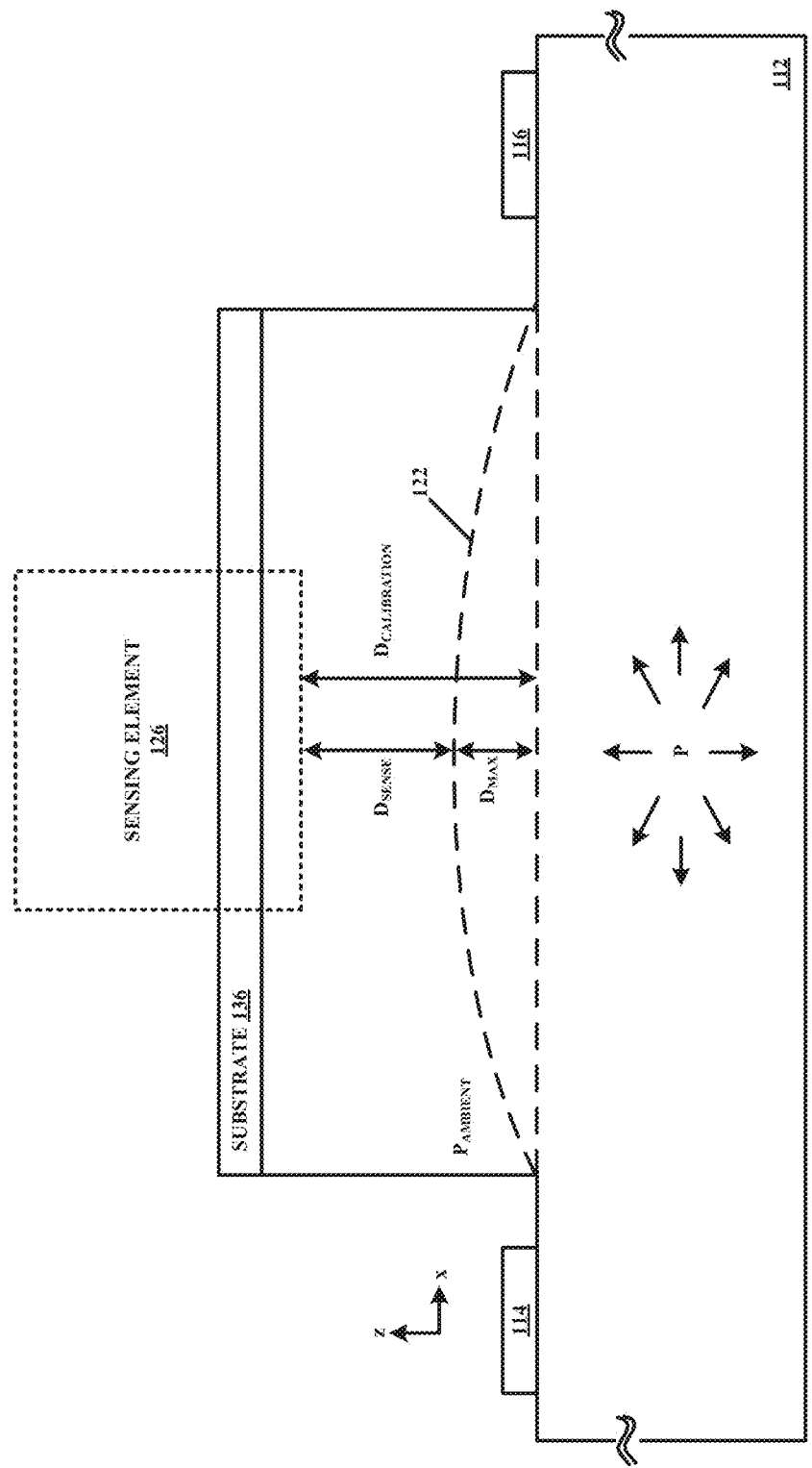
FIG. 6 shows a cross-section of the system of FIG. 5 in first example detail.

In particular, FIG. 5 shows system 100 of FIG. 1 whereby sensing element 126 (equivalently, battery cell arrangement 102) is configured as a proximity sensor according to an example implementation. FIG. 6 shows a cross-section of the system of FIG. 5 in first example detail. Specifically, sensing element 126 is mounted to a substrate 136, such as to a top side of substrate 136, a bottom side of substrate 136, or within or internal (embedded) to substrate 136, or any combination thereof, as indicated by intermittent line in FIG. 6. In this example, it is contemplated that battery cell arrangement 102 is configured to output signal 124 whereby deformation D of membrane 122 under load from internal cell pressure is encoded within amplitude A of signal 124 (e.g., amplitude A=deformation $D_{MAX}=D_{CALIBRATION}-D_{SENSE}$ as shown in FIG. 6). It is further contemplated that battery management system 104 is configured to receive signal 124 and correlate amplitude A of signal 124 with a particular internal cell pressure P (e.g., based on a table look-up or other implementation-specific algorithm) such that battery management system 104 may in practice generate command signal 134 to electrically decouple battery cell 112 from load 108 (only as an example), by controlling state of switch 106, when the value of the internal pressure of battery cell 112 is greater than or equal to a threshold pressure value (see FIG. 1). For example, under load conditions whereby internal cell pressure P is determined to be greater than or equal pressure P3 (4.9 bar), as shown in FIG. 4, battery management system 104 may generate command signal 134 to electrically decouple battery cell 112 from load 108. With reference to FIG. 5 alone, battery cell arrangement 102 may be configured as a capacitive proximity sensor or an inductive proximity sensor, whereby amplitude A of signal 124 as a function of deformation D) ($D_{MAX}$) over an elastic deformation range of membrane 122 is illustrated in FIG. 5 for both capacitive proximity sensor and inductive proximity sensor implementations in accordance with the principles of the present disclosure. One of skill in the art will appreciate that the trend for amplitude A as shown in FIG. 5 for both capacitive proximity sensor or an inductive proximity sensor examples may be implementation-specific, and may in general take any shape or form as desired provided that amplitude A may be uniquely correlated with a particular internal cell pressure within specification tolerance. The elastic deformation range of membrane 122 is discussed below in connection with at least FIG. 17.

Figure 7:
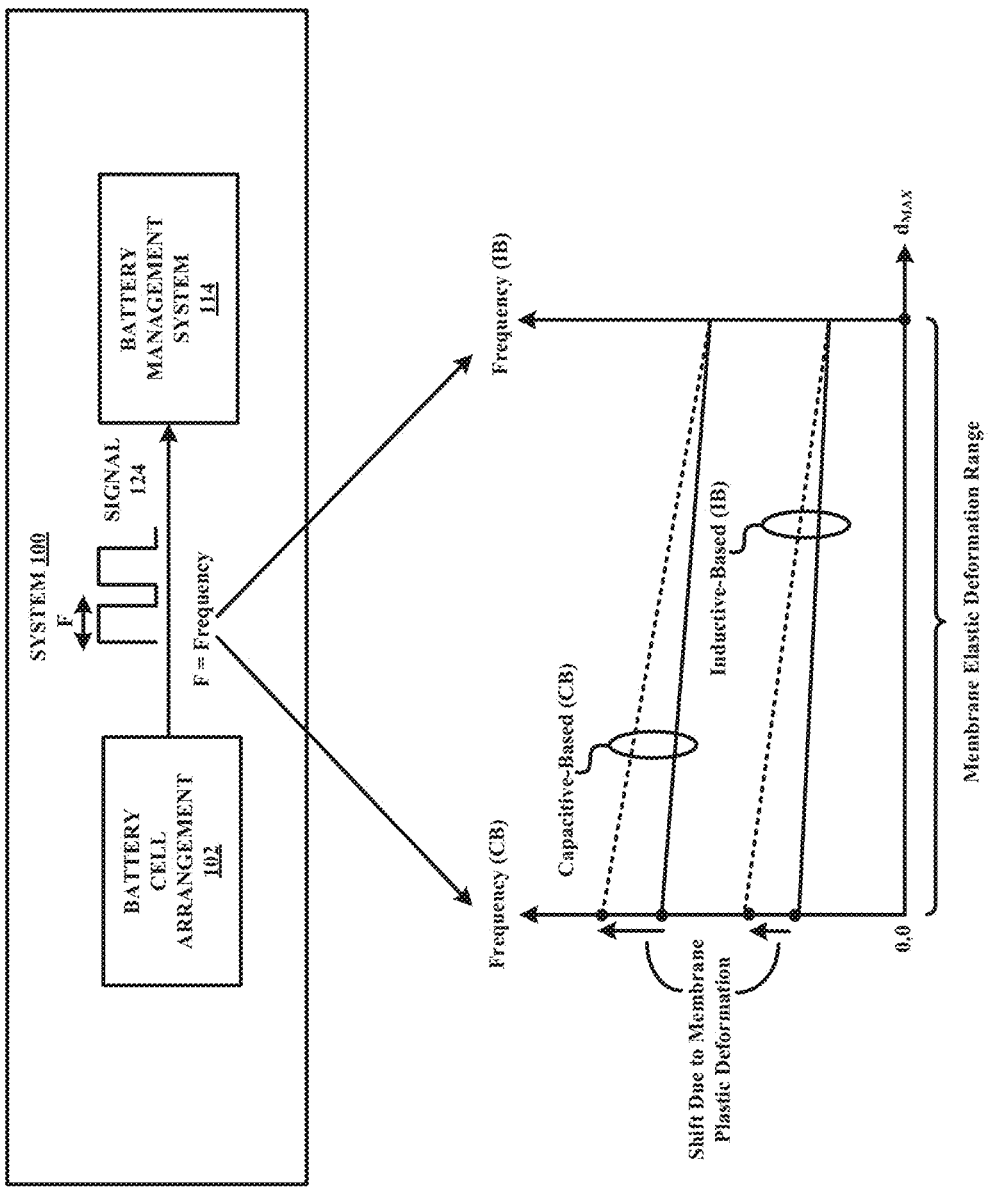
FIG. 7 shows the system of FIG. 1 whereby a sensing element is part of an oscillator circuit according to an example implementation.

FIG. 7 in contrast shows system 100 of FIG. 1 whereby sensing element 126 (equivalently, battery cell arrangement 102) is configured as a sensing element as part of an oscillator circuit (equivalently, resonant sensor) according to an example implementation. In this example, it is contemplated that battery cell arrangement 102 is configured to output signal 124 whereby deformation D of membrane 122 under load from internal cell pressure is encoded within frequency F of signal 124 (e.g., frequency F≡deformation $D_{MAX}-\Delta D$, where $\Delta D$ is error offset and is a function of $D_{CALIBRATION}$, as shown in FIG. 6), and a value for frequency F (e.g., F=1 kHz) of signal 124 is based upon extent of electric or magnetic field coupling between sensing element 126 and membrane 122. It is further contemplated that battery management system 104 is configured to receive signal 124 and correlate frequency F of signal 124 with a particular internal cell pressure P (e.g., based on a table look-up or other implementation-specific algorithm) such that battery management system 104 may in practice generate command signal 134 to electrically decouple battery cell 112 from load 108 (as an example only), by controlling state of switch 106, when the value of the internal pressure of battery cell 112 is greater than or equal to a threshold pressure value.

In general, battery cell arrangement 102 may be configured as a capacitive sensing element as part of an oscillator circuit or an inductive sensing element as part of an oscillator circuit, whereby frequency P of signal 124 as a function of deformation D ($D_{MAX}$) of membrane 122 over an elastic deformation range of membrane 122 is illustrated in FIG. 7 for both a capacitive sensing element as part of an oscillator circuit and an inductive sensing element as part of an oscillator circuit implementation. One of skill will appreciate that the trend for frequency F as shown in FIG. 7 for both capacitive sensing element as part of an oscillator circuit or inductive sensing element as part of an oscillator circuit examples may be implementation-specific, and may in general take any shape or form as desired provided that frequency F may be uniquely correlated with a particular internal cell pressure within specification tolerance. Example architectures or topologies for the sensor circuitry as discussed in connection with at least FIGS. 5-7 are further illustrated FIGS. 8-16.

Figure 8:
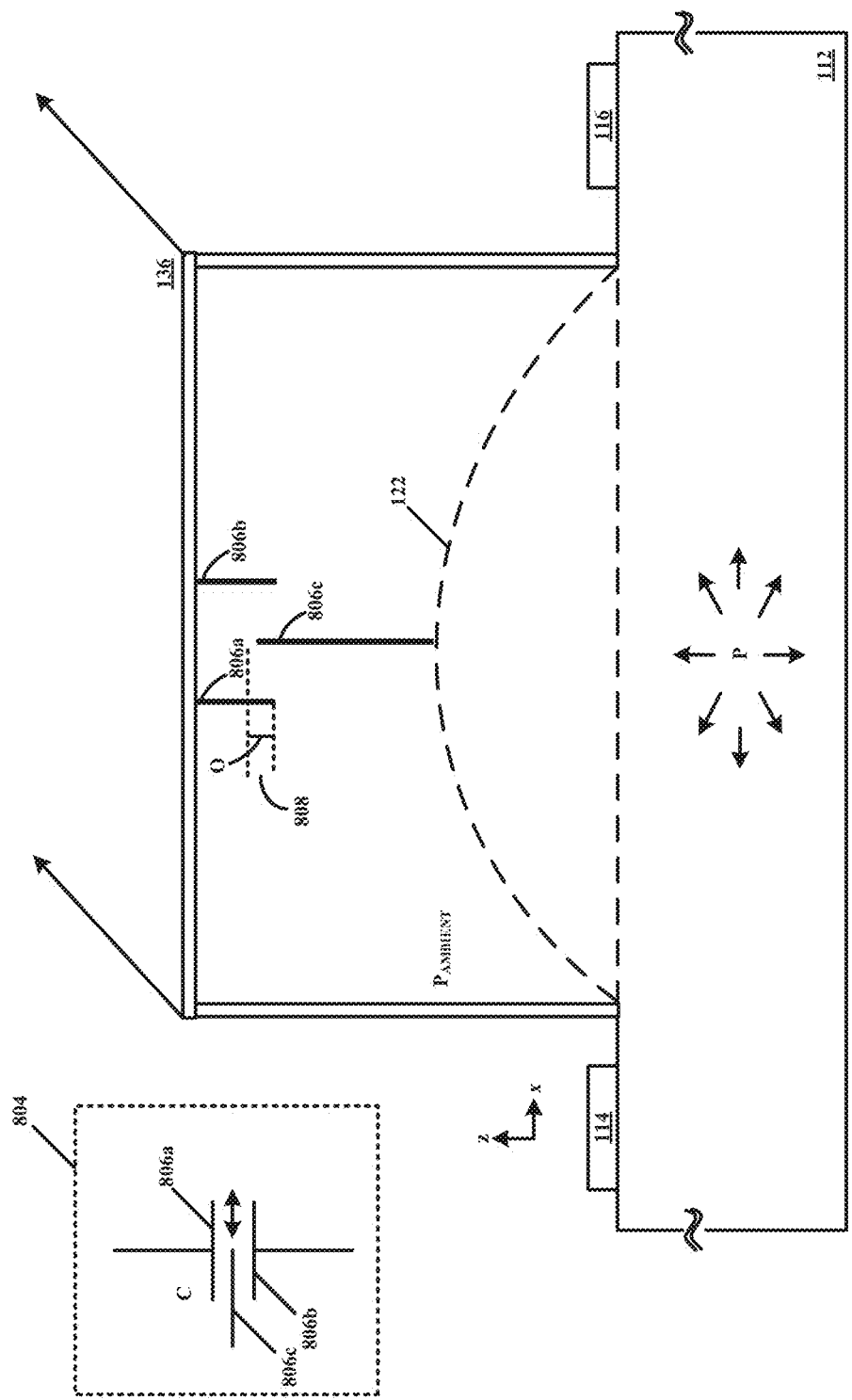
FIG. 8 shows a cross-section of the system of FIG. 5 in second example detail.

For example, FIG. 8 shows a cross-section of the system of FIG. 5 in second example detail. In this example, it is contemplated that a plurality of fins 806a-c (three as depicted in FIG. 8, although other examples are possible) may be mounted to membrane 122 and to substrate 136, respectively, whereby fins 806a-c (e.g., made of one of rubber and ceramic) are arranged in an interleaved manner with respect to each other and are configured to slide between each other as a result of pressure within housing 118 of battery cell 112 being exerted on membrane 122 of housing 118 of battery cell 112 (see FIG. 2). In practice, extent of overlap 808 (see FIG. 8) between respective ones of fins 806a-c is proportional to realized or effective permittivity of the medium between fins 806a and 806b, which form plates of a capacitor 804. For example, effective permittivity for a first overlap distance O1 is greater than effective permittivity for a second overlap distance O2 when the first overlap distance O1 is greater than the second overlap distance O1 (see overlap distance O in FIG. 8).

In this example, by extension, capacitance between fins 806a and 806b, which form plates of a capacitor 804, for the first overlap distance O1 is greater than capacitance between fins 806a and 806b for the second overlap distance O2 as per the relation C=εA/d. In FIG. 8, the plates of capacitor 804 are formed by "upper" fins 806a and 806b. The "lower" fin 806c is not a capacitor plate but a dielectric material that is pushed between "upper" fins 806a and 806b by the deformation of membrane 122, which in turn changes the capacitance between fins 806a and 806b by changing the permeability of the material between fins 806a and 806b. Other example architectures or topologies for the sensor circuitry as discussed in connection with at least FIGS. 5-7 are contemplated.

Figure 9:
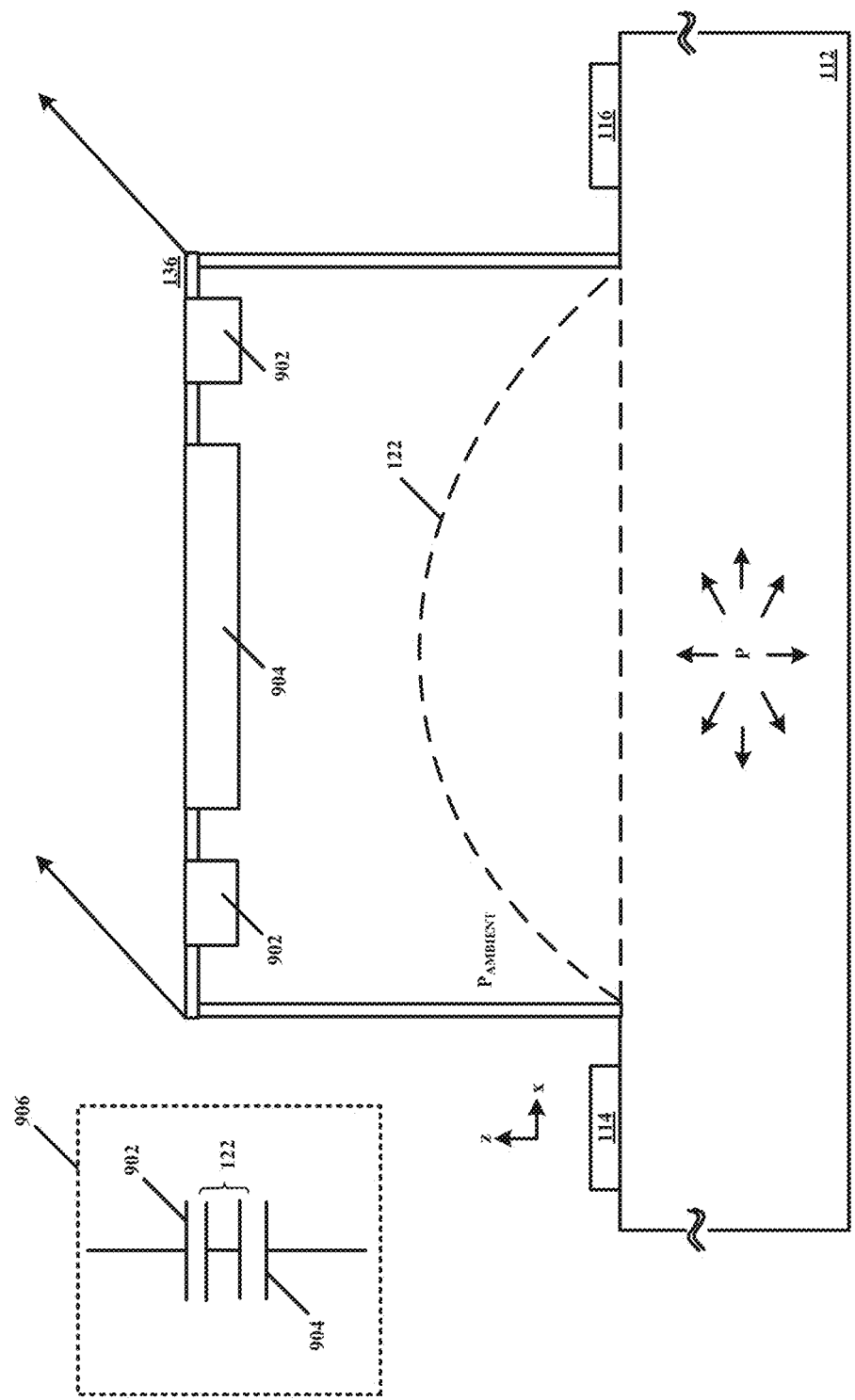
FIG. 9 shows a cross-section of the system of FIG. 5 in third example detail.
Figure 10:
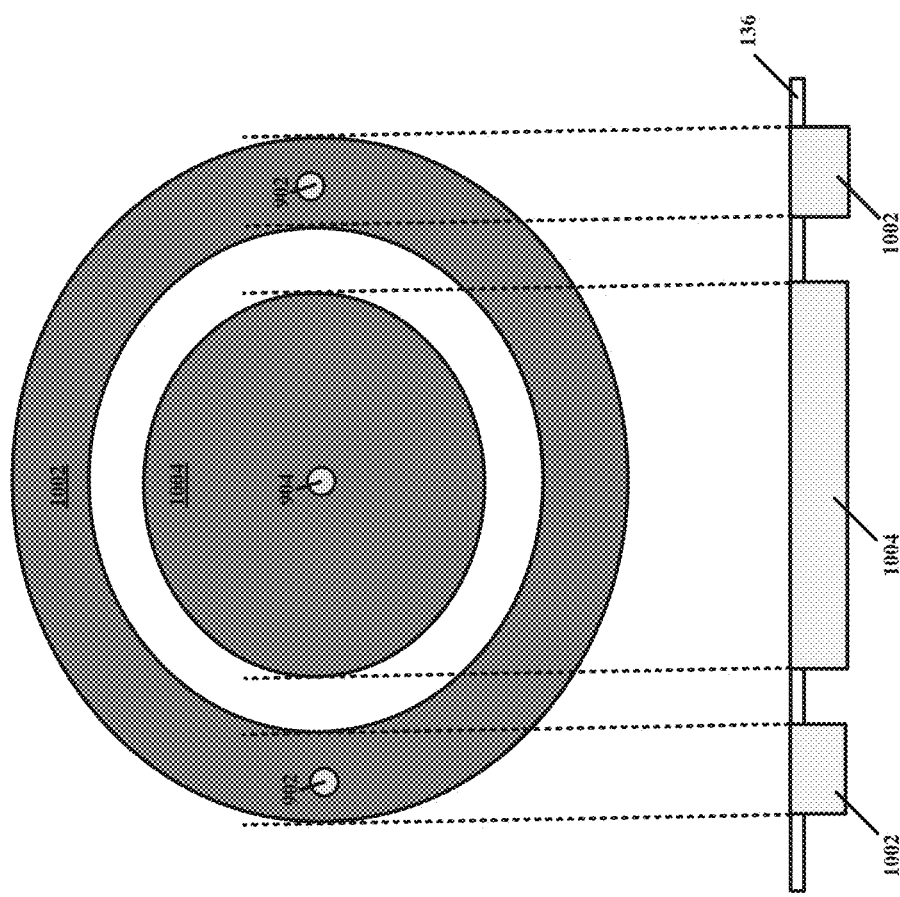
FIG. 10 shows multiple perspective views of a substrate of FIG. 10.

For example, FIG. 9 shows a cross-section of the system of FIG. 5 in third example detail. FIG. 10 shows multiple perspective views of substrate (PCB) 136 of FIG. 9. More specifically, metallic (e.g., aluminum) membrane 122 which is part of an outer shell 118 of battery cell 112 (see FIG. 2) is used as an element of capacitive-based sensor circuitry in order to measure a change of capacitance under deformation of membrane 122 from internal pressure of battery cell 112. The change of capacitance may in turn be used to derive a value for the internal pressure of battery cell 112. In this example, a ring-shaped electrode surface 902 formed on (or embedded, or any combination thereof) substrate 136, a disk-shaped electrode surface 904 formed on substrate 136, and membrane 122 together define first, second and third electrodes of a capacitor element 906, whereby electrical contact to ring-shaped electrode surface 902 and disk-shaped electrode surface 904 is in one example established through (via) dielectric surface layers 1002, 1004, respectively, as illustrated in FIG. 10. Other examples are possible.

In practice, a change in distance between respective ones of electrode surfaces 902, 904 and membrane 122 due to deformation of membrane 122 under load from internal cell pressure of battery cell 112 translates into a change of capacitance as per the relation C=εA/d, which is approximate in the example implementation. This is because the poles of capacitor element 906 are positioned on one side of substrate 136, using membrane 122 as a common (internal) plate, which may be regarded as a series connection of two capacitors formed by electrode surfaces 902, 904 and membrane 122. Nonetheless, the change in capacitance in turn may be leveraged by any one of the capacitive proximity sensor and the capacitive sensing element as part of an oscillator circuit as discussed above in connection with FIGS. 5-7, respectively, to derive a value for the internal pressure of battery cell 112 in accordance with the principles of the present disclosure. Other example architectures or topologies for the sensor circuitry as discussed in connection with at least FIGS. 5-7 are contemplated.

Figure 11:
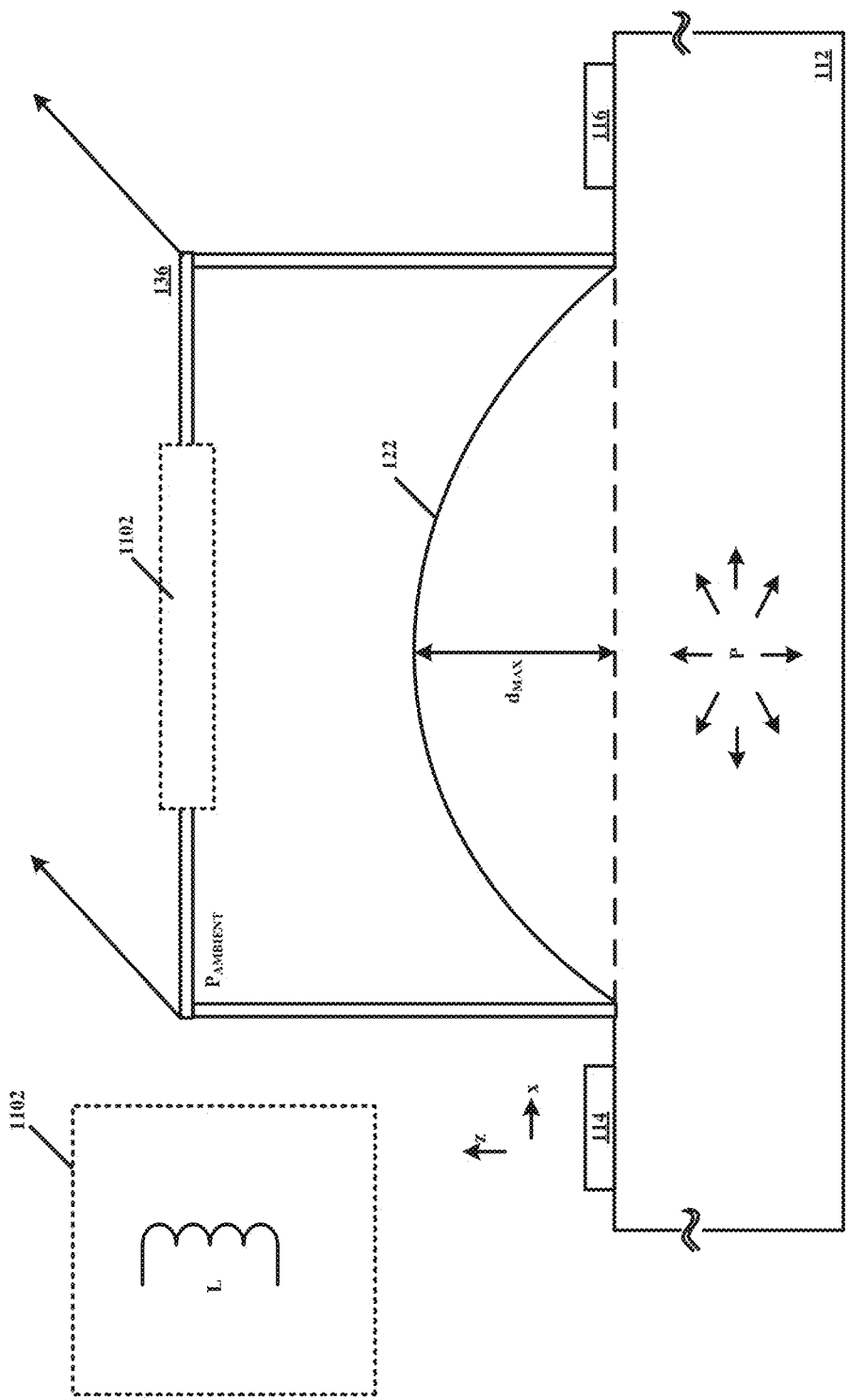
FIG. 11 shows a cross-section of the system of FIG. 7 in first example detail.
Figure 12:
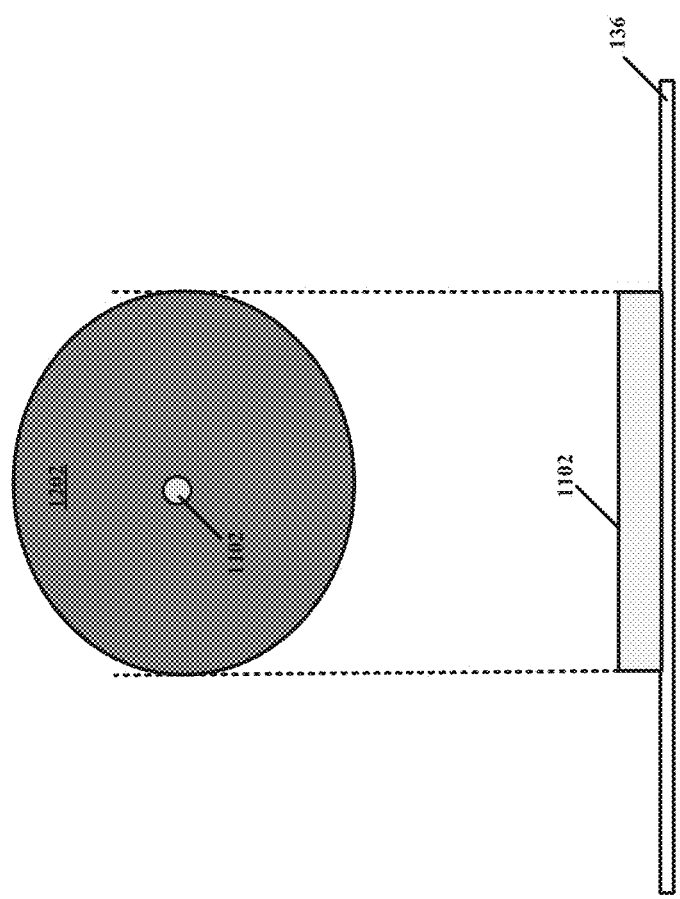
FIG. 12 shows multiple perspective views of a substrate of FIG. 11.
Figure 13:
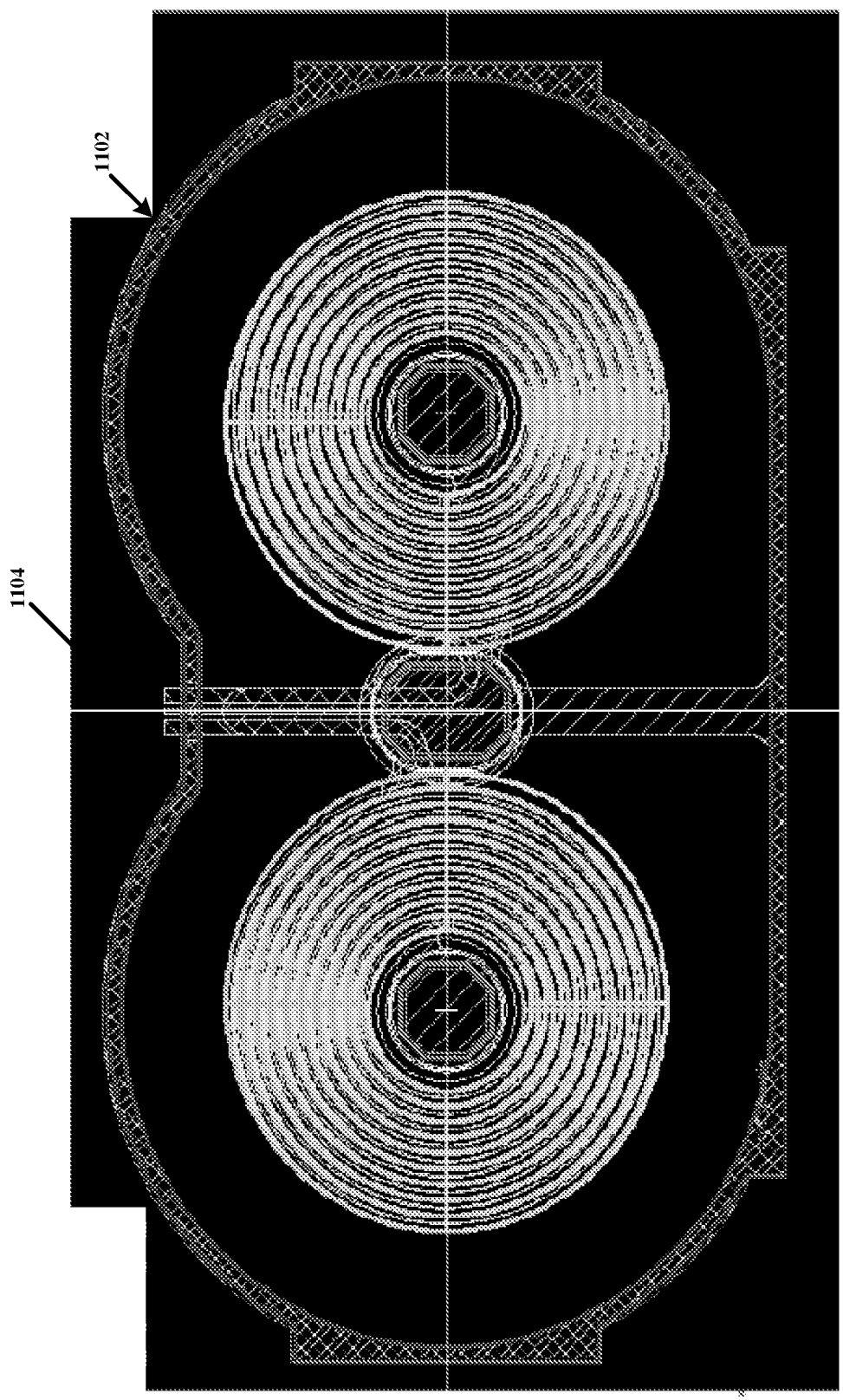
FIGS. 13-16 collectively show multiple views of an inductor element and/or coils of an inductor element integrated onto a semiconductor die or chip.
Figure 14:
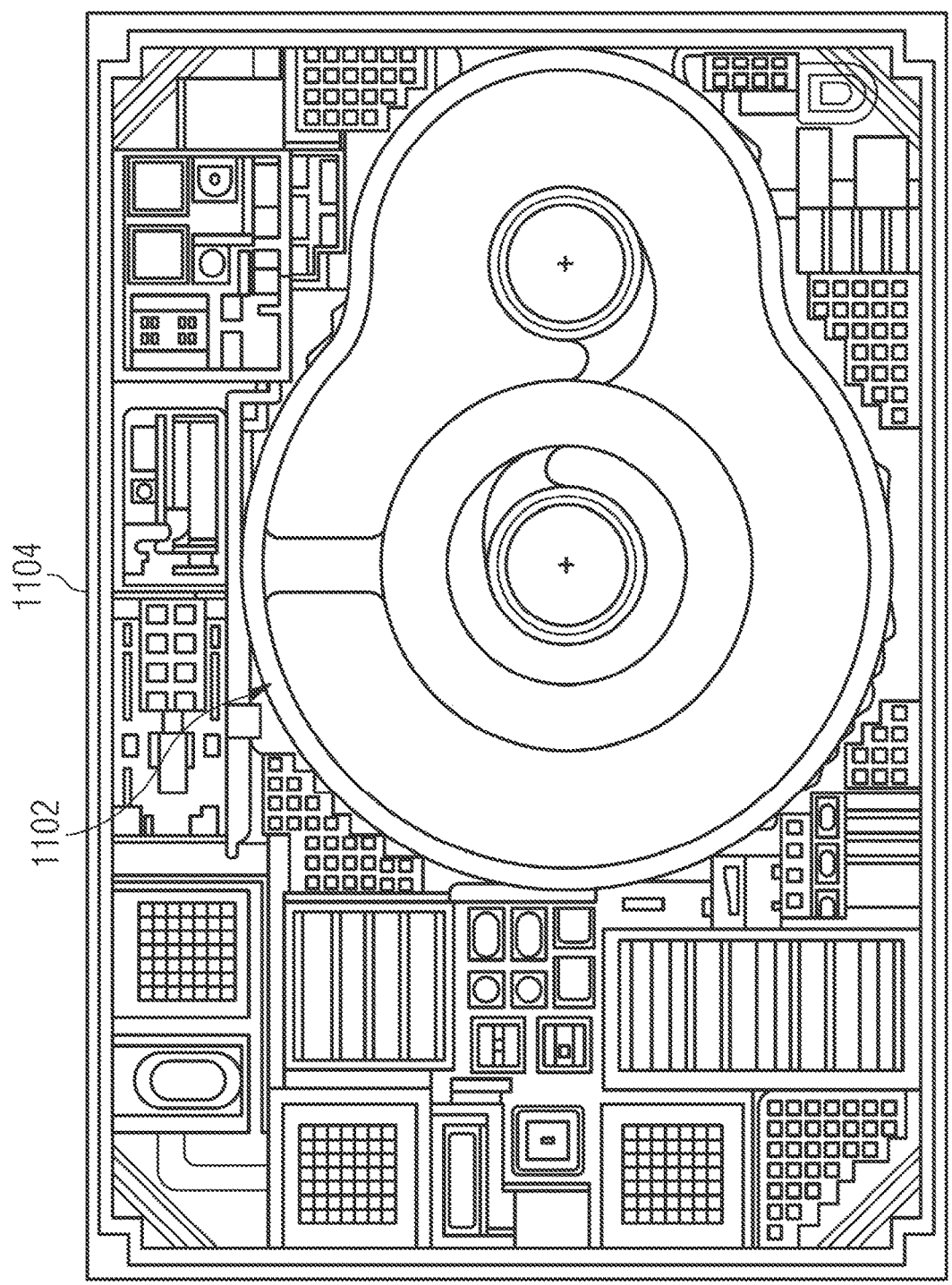
Figure 15:
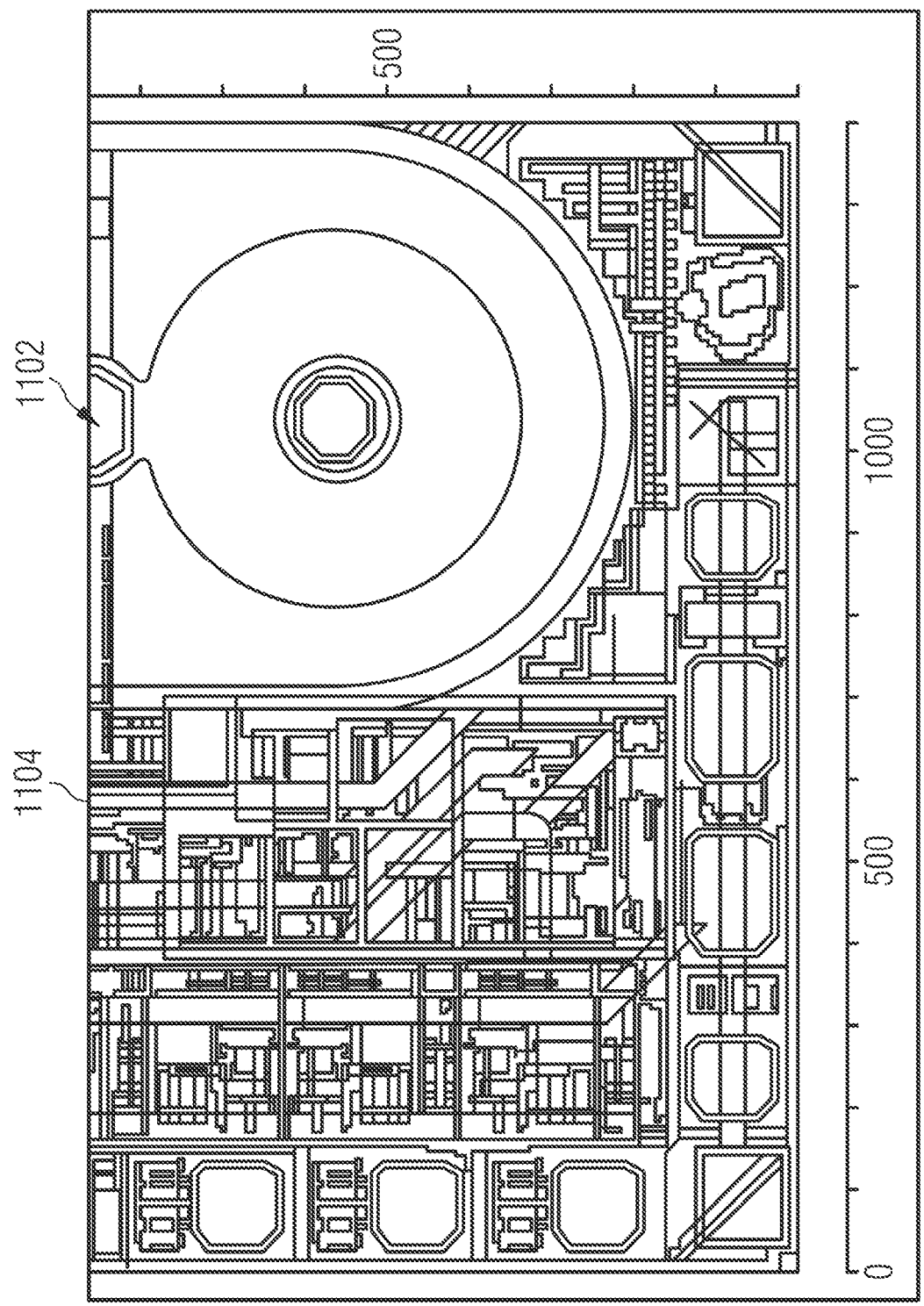
Figure 16:
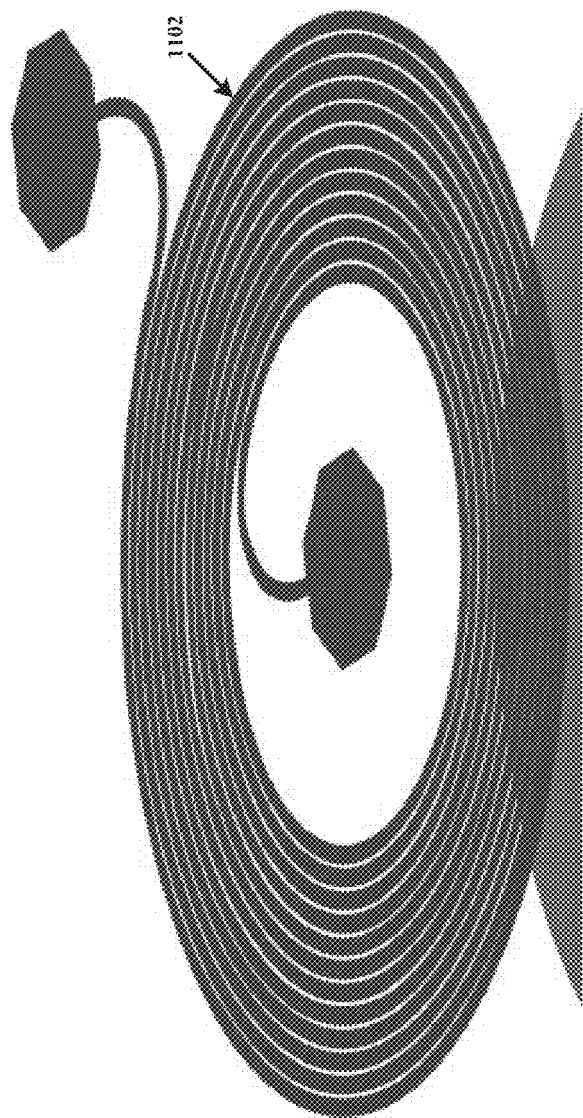

For example, FIG. 11 shows a cross-section of the system of FIG. 7 in first example detail. FIG. 12 shows a multiple perspective views of a substrate (PCB) of FIG. 11. More specifically, membrane 122 which is part of an outer shell (housing) 118 of battery cell 112 is used as an element of inductive-based sensor circuitry in order to measure a change of inductance under deformation of membrane 122 from internal pressure of battery cell 112. The change of inductance may in turn be used to derive a value for the internal pressure of battery cell 112. In this example, inductor element 1102 is formed on (or embedded, or any combination thereof) substrate 136, whereby electrical contact to inductor element 1102 is in one example established through (via) dielectric surface layer 1202 as illustrated in FIG. 12, and inductor element 1102 in general may correspond to any one of a printed (planar) inductor, a discrete (non-planar) inductor, and an inductor incorporated within an integrated circuit or semiconductor die or chip 1104. For example, FIGS. 13-16 collectively show multiple views of inductor element 1102 and/or coils of inductor element 1102 integrated onto a semiconductor die or chip 1104. Thus, as shown and described in connection with FIGS. 11-16, inductor element 1102 may correspond to any one of a printed (planar) inductor, a discrete (non-planar) inductor, and an inductor incorporated within an integrated circuit or semiconductor die or chip 1104, as would be understood by one of ordinary skill in the art.

With reference to FIGS. 11-16, in practice a change in distance between inductor element 1102 and membrane 122 due to deformation of membrane 122 under load from internal cell pressure of battery cell 112 translates into a change of inductance as per the relation $L=N\Phi/I$, whereby N is the number of turns of a coil of inductor element 1102, $\Phi$ is magnetic flux linkage, which is a function of distance between inductor element 1102 and membrane 122, and I is magnitude of current in amperes passing through inductor element 1102 under bias. This change in inductance in turn may be leveraged by any one of the inductive proximity sensor and inductive sensing element as part of an oscillator circuit as discussed above in connection with FIGS. 5-7, respectively, to derive a value for the internal pressure of battery cell 112 in accordance with the principles of the present disclosure.

Figure 17:
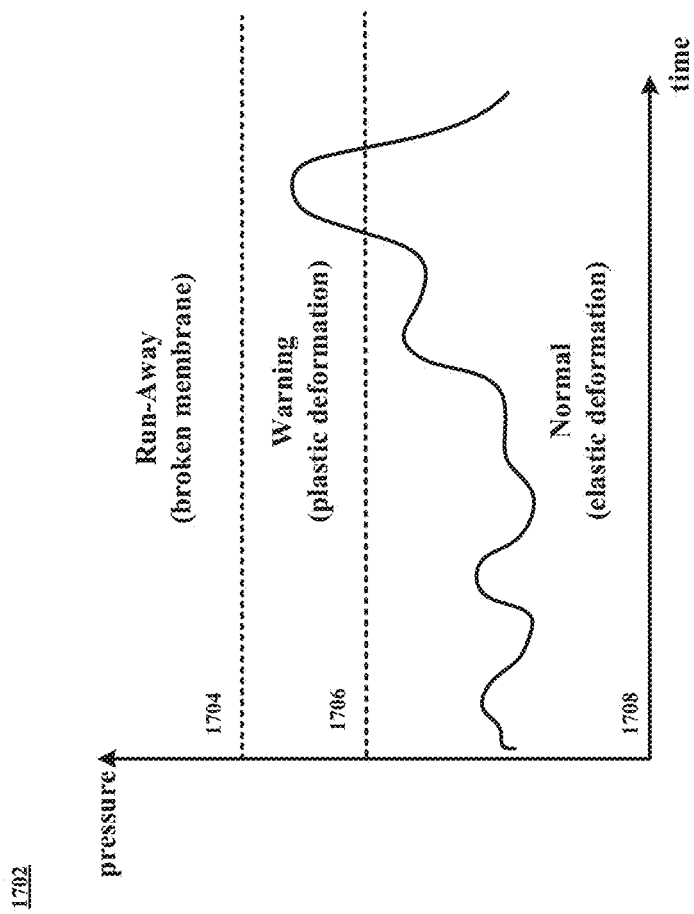
FIG. 17 shows a plot of internal cell pressure exerted on a membrane of a battery cell arrangement of FIG. 1 over time.

As mentioned above, the elastic deformation range of membrane 122 (of FIGS. 1-16) is discussed in connection with at least FIG. 17. More specifically, FIG. 17 shows a plot 1702 of internal cell pressure exerted on membrane 122 of battery cell arrangement 102 of FIG. 1 over time, as an example. In this example, the ordinate axis is partitioned into a run-away zone 1704, a plastic deformation zone 1706, and an elastic deformation zone 1708. Under normal conditions, from the perspective of battery cell 112, internal cell pressure exerted on membrane 122 is such that membrane 122 experiences elastic deformation. That is, the structural integrity of membrane 122 is not compromised as long as internal cell pressure exerted on membrane 122 is maintained within elastic deformation zone 1708. The structural integrity of membrane 122 may or might be compromised when internal cell pressure exerted on membrane 122 is within plastic deformation zone 1406, depending on how long (in time) such pressures are maintained. If the structural integrity of membrane 122 is compromised, then membrane 122 may not relax to a consistent initial state. This may lead to inaccuracies in determination of deflection D of membrane 122 and, by extension, to inaccuracies in determination of internal cell pressure P of battery cell 112 in a manner as contemplated throughout. To address such an issue, a calibration procedure may be implementation by battery cell arrangement 102 to determine a parameter $D_{CALIBRATION}$ (see FIG. 6) to account for this error offset such that true deformation of membrane 122 may be derived or determined. Finally, the structural integrity of membrane 122 may be permanently destroyed be when internal cell pressure exerted on membrane 122 reaches run-away zone 1704. In practice, it is contemplated that a system read-out may provide a real-time indication of status of membrane 122 (run-away zone 1704, plastic deformation zone 1706, an elastic deformation zone 1708) to diagnostic and/or user-interface-related circuitry.

With reference to the discussion provided in connection with FIGS. 1-17, it is in this manner that the present disclosure is directed to techniques for monitoring battery cell internal pressure whereby a membrane that is part of an outer shell of the battery cell is used as an element of capacitive-based or inductive-based sensor circuitry in order to measure a change of capacitance or inductance under deformation of the membrane from internal pressure of the battery cell. The change of capacitance or inductance may in turn be used to derive a value for the internal pressure of the battery cell, and it will be appreciated that the topology of the capacitive-based or inductive-based sensor circuitry may be implementation-specific. For example, the capacitive-based sensor circuitry or inductive-based sensor circuitry may correspond to an RC or RL oscillator, respectively, whereby the frequency of the oscillator is then measured by a microcontroller. Other solutions such as a Wien-Robinson oscillator, or a constant current source to charge a capacitor and to monitor the change in capacitor voltage over time, may be leverage for capacitive-based sensor circuitry implementations.

For inductive-based sensor circuitry implementations, a general way to detect a change in the magnetic flux of an environment is to create an oscillator containing a coil located close to the component to be supervised. If the component moves or gets deformed, the resulting oscillator frequency will change accordingly. In order to achieve a high resolution and noise immunity (against the environment), an averaging filter may be used. An averaging filter may be built by a counter that counts the number of oscillator periods during a defined time window. The result of the counter at the end of the counting window may indicate the distance or the shape of the component to be supervised to the coil. If there are specific frequency components known in the environmental noise (e.g. due to the switching operation of a power inverter), the averaging filter window length can be adapted to comprise always a similar amount of switching events during the time windows (synchronization of counting window and power inverter). The coil itself can be built in many different ways. A "real" coil with several windings as independent component may be more expensive than a printed version on a PCB. The printed version may have less inductance. In the case where a printed version is used, the PCB can carry a sensing element containing the rest of the oscillator and some measurement units, such as a counter for counting the oscillator periods or an independent time base as frequency reference. Another possibility is to use a coil that is realized in/on an integrated circuit chip itself, together with the other building blocks of the sensing element. Like this, the complete oscillator and the measurement blocks can be integrated into a single device. With the inductive approach, the package of the sensing element can be completely closed, and no other geometric elements are necessarily needed. For example, there are coils already monolithically integrated, especially for high-frequency applications or to achieve galvanic insulation in gate drivers for power switches.

Although the present disclosure is not so limited, the following numbered examples demonstrate one or more aspects of the disclosure.

Example 1

A device comprising a sensing arrangement configured to be mounted to a battery cell that comprises a housing having an opening and a membrane that is deformable and configured to hermetically seal the opening of the housing of the battery cell, wherein the sensing arrangement is further configured to sense a deformation of the membrane as a result of a pressure within the housing of the battery cell being exerted on the membrane, and wherein the device is configured to output a signal indicative of the pressure within the housing of the battery cell to a battery management system, the signal being based on the deformation of the membrane.

Example 2

The device of example 1, wherein the sensing arrangement comprises a sensing element that is configured to be arranged adjacent to the membrane of the housing of the battery cell, and a measurement unit configured to measure a physical parameter of the sensing element that is dependent on the deformation of the membrane.

Example 3

The device of any one of examples 1-2, wherein the measurement unit is further configured to: convert the physical parameter of the sensing element into time information, compare the time information with reference time information, and determine information on the deformation of the membrane based on a result of the comparison.

Example 4

The device of any one of examples 1-3, further comprising a printed circuit board configured to be arranged at a predetermined distance from and adjacent to the membrane of the housing of the battery cell, wherein the sensing element comprises a capacitive element having a first electrode surface and a second electrode surface, wherein the first electrode surface is formed on the printed circuit board and the second electrode surface is formed by the membrane of the housing of the battery cell when the sensing arrangement is mounted to the battery cell.

Example 5

The device of any one of examples 1-4, wherein the sensing element further comprises a second capacitive element being connected in series with the capacitive element and having an electrode surface, wherein the electrode surface of the second capacitive element is formed on the printed circuit board and is electrically isolated from the first electrode surface of the capacitive element, wherein the electrode surface of the second capacitive element and the second electrode surface of the capacitive element form electrodes of the second capacitive element when the sensing arrangement is mounted to the battery cell.

Example 6

The device of any one of examples 1-5, wherein the first electrode surface of the capacitive element is formed on the printed circuit board as a disk-shaped structure and the electrode surface of the second capacitive element is formed on the printed circuit board as a ring-shaped structure surrounding the disk-shaped structure, wherein the disk-shaped structure and the membrane of the housing of the battery cell form the electrodes of the capacitive element and the ring-shaped structure and the membrane of the housing of the battery cell form the electrodes of the second capacitive element when the sensing arrangement is mounted to the battery cell.

Example 7

The device of any one of examples 1-6, wherein a first set of fins is arranged on the first electrode surface of the capacitive element in an interleaved manner with respect to a second set of fins arranged on the second electrode surface of the capacitive element when the sensing arrangement is mounted to the battery cell, wherein the first set of fins and second set of fins are configured to slide between each other as a result of the pressure within the housing of the battery cell being exerted on the membrane of the housing of the battery cell.

Example 8

The device of any one of examples 1-7, wherein the first set of fins and second set of fins are made of one of rubber and ceramic.

Example 9

The device of any one of examples 1-8, further comprising a printed circuit board configured to be arranged at a predetermined distance from and adjacent to the membrane of the housing of the battery cell, wherein the sensing element comprises an inductive element that is arranged on the printed circuit board, wherein the measurement unit is configured to measure a change of magnetic permeability as a result of the pressure within the housing of the battery cell being exerted on the membrane of the housing of the battery cell when the sensing arrangement is mounted to the battery cell.

Example 10

The device of any one of examples 1-9, wherein the inductive element comprises a discrete inductor element or a planar inductor element that is printed on the printed circuit board.

Example 11

A battery cell arrangement comprising a battery cell comprising a housing having an opening and a membrane that is deformable and configured to hermetically seal the opening of the housing, and a sensing arrangement arranged at a predetermined distance from and adjacent to the membrane of the housing, wherein the sensing arrangement is configured to sense a deformation of the membrane as a result of a pressure within the housing being exerted on the membrane, and wherein the battery cell arrangement is configured to output a signal indicative of the pressure within the housing of the battery cell to a battery management system, the signal being based on the deformation of the membrane.

Example 12

The battery cell arrangement of example 11, wherein the membrane of the housing is a pressure relief membrane configured to relieve an excess pressure within the battery cell through the opening of the housing.

Example 13

The battery cell arrangement of any one of examples 11-12, wherein the sensing arrangement further comprises a printed circuit board arranged at a predetermined distance from and adjacent to the membrane of the housing of the battery cell, wherein the sensing arrangement comprises a capacitive element having a first electrode surface and a second electrode surface, wherein the first electrode surface is formed on the printed circuit board and the second electrode surface is formed by the membrane of the housing of the battery cell.

Example 14

The battery cell arrangement of any one of examples 11-13, wherein the sensing arrangement further comprises a second capacitive element being connected in series with the capacitive element and having an electrode surface, wherein the electrode surface of the second capacitive element is formed on the printed circuit board and is electrically isolated from the first electrode surface of the capacitive element, wherein the electrode surface of the second capacitive element and the second electrode surface of the capacitive element form electrodes of the second capacitive element.

Example 15

The battery cell arrangement of any one of examples 11-14, wherein a first set of fins is arranged on the first electrode surface of the capacitive element in an interleaved manner with respect to a second set of fins arranged on the second electrode surface of the capacitive element, wherein the first set of fins and second set of fins are configured to slide between each other as a result of the pressure within the housing of the battery cell being exerted on the membrane of the housing of the battery cell.

Example 16

The battery cell arrangement of any one of examples 11-15, wherein the membrane of the housing comprises a metal element, preferably aluminum.

Example 17

The battery cell arrangement of any one of examples 11-16, wherein the sensing arrangement further comprises a printed circuit board arranged at a predetermined distance from and adjacent to the membrane of the housing of the battery cell, wherein the sensing arrangement comprises an inductive element that is arranged on the printed circuit board, wherein the sensing arrangement is configured to measure a change of magnetic permeability as a result of the pressure within the housing of the battery cell being exerted on the membrane of the housing of the battery cell.

Example 18

The battery cell arrangement of any one of examples 11-17, wherein the inductive element comprises a discrete inductor element or a planar inductor element that is printed on the printed circuit board.

Example 19

The battery cell arrangement of any one of examples 11-18, wherein the membrane of the housing comprises a ferromagnetic element, preferably ferrite.

Example 20

A battery management system comprising a receiving unit configured to receive, from a battery cell arrangement, a signal indicative of an internal pressure of a battery cell, and a processing unit configured to determine a value of the internal pressure of the battery cell based on the signal received from the battery cell arrangement, and to generate a command signal to electrically decouple the battery cell from a load when the value of the internal pressure of the battery cell is greater than or equal to a threshold pressure value.

Various examples of the disclosure have been described. Any combination of the described systems, operations, or functions is contemplated. These and other examples are within the scope of the following claims.

What is claimed is:

1. A device comprising:
    a sensing arrangement configured to be mounted to a battery cell that comprises a housing having an opening and a membrane that is deformable and configured to hermetically seal the opening of the housing of the battery cell,
    wherein the sensing arrangement comprises a sensing element configured to sense a change in capacitance or inductance under deformation of the membrane from a pressure within the housing of the battery cell,
    wherein the sensing arrangement is further configured to sense a deformation of the membrane as a result of the pressure within the housing of the battery cell being exerted on the membrane, and
    wherein the device is configured to output a signal indicative of the pressure within the housing of the battery cell to a battery management system, the signal being based on the deformation of the membrane and further based on the change in capacitance or inductance.

2. The device of claim 1,
    wherein the sensing element is configured to be arranged adjacent to the membrane of the housing of the battery cell, and
    wherein the sensing arrangement further comprises a measurement unit configured to measure a physical parameter of the sensing element that is dependent on the deformation of the membrane.

3. The device of claim 2, wherein the measurement unit is further configured to:
    convert the physical parameter of the sensing element into time information,
    compare the time information with reference time information, and
    determine information on the deformation of the membrane based on a result of the comparison.

4. The device of claim 1, further comprising a printed circuit board configured to be arranged at a predetermined distance from and adjacent to the membrane of the housing of the battery cell,
    wherein the sensing element comprises a capacitive element having a first electrode surface and a second electrode surface, and
    wherein the first electrode surface is formed on the printed circuit board and the second electrode surface is formed by the membrane of the housing of the battery cell when the sensing arrangement is mounted to the battery cell.

5. The device of claim 4, wherein the sensing element further comprises a second capacitive element being connected in series with the capacitive element and having an electrode surface,
wherein the electrode surface of the second capacitive element is formed on the printed circuit board and is electrically isolated from the first electrode surface of the capacitive element, and
wherein the electrode surface of the second capacitive element and the second electrode surface of the capacitive element form electrodes of the second capacitive element when the sensing arrangement is mounted to the battery cell.

6. The device of claim 5,
wherein the first electrode surface of the capacitive element is formed on the printed circuit board as a disk-shaped structure and the electrode surface of the second capacitive element is formed on the printed circuit board as a ring-shaped structure surrounding the disk-shaped structure, and
wherein the disk-shaped structure and the membrane of the housing of the battery cell form the electrodes of the capacitive element and the ring-shaped structure and the membrane of the housing of the battery cell form the electrodes of the second capacitive element when the sensing arrangement is mounted to the battery cell.

7. The device of claim 4,
wherein a first set of fins is arranged on the first electrode surface of the capacitive element in an interleaved manner with respect to a second set of fins arranged on the second electrode surface of the capacitive element when the sensing arrangement is mounted to the battery cell, and
wherein the first set of fins and second set of fins are configured to slide between each other as a result of the pressure within the housing of the battery cell being exerted on the membrane of the housing of the battery cell.

8. The device of claim 7, wherein the first set of fins and second set of fins are made of one of rubber and ceramic.

9. The device of claim 2, further comprising a printed circuit board configured to be arranged at a predetermined distance from and adjacent to the membrane of the housing of the battery cell,
wherein the sensing element comprises an inductive element that is arranged on the printed circuit board, and
wherein the measurement unit is configured to measure a change of magnetic permeability as a result of the pressure within the housing of the battery cell being exerted on the membrane of the housing of the battery cell when the sensing arrangement is mounted to the battery cell.

10. The device of claim 9, wherein the inductive element comprises a discrete inductor element or a planar inductor element that is printed on the printed circuit board.

11. A battery cell arrangement comprising:
a battery cell comprising a housing having an opening and a membrane that is deformable and configured to hermetically seal the opening of the housing; and
a sensing arrangement arranged at a predetermined distance from and adjacent to the membrane of the housing,
wherein the sensing arrangement comprises a sensing element configured to sense a change in capacitance or inductance under deformation of the membrane from a pressure within the housing of the battery cell,
wherein the sensing arrangement is configured to sense a deformation of the membrane as a result of the pressure within the housing being exerted on the membrane, and
wherein the battery cell arrangement is configured to output a signal indicative of the pressure within the housing of the battery cell to a battery management system, the signal being based on the deformation of the membrane and further based on the change in capacitance or inductance.

12. The battery cell arrangement of claim 11, wherein the membrane of the housing is a pressure relief membrane configured to relieve an excess pressure within the battery cell through the opening of the housing.

13. The battery cell arrangement of claim 11,
wherein the sensing arrangement further comprises a printed circuit board arranged at a predetermined distance from and adjacent to the membrane of the housing of the battery cell,
wherein the sensing arrangement comprises a capacitive element having a first electrode surface and a second electrode surface, and
wherein the first electrode surface is formed on the printed circuit board and the second electrode surface is formed by the membrane of the housing of the battery cell.

14. The battery cell arrangement of claim 13,
wherein the sensing arrangement further comprises a second capacitive element being connected in series with the capacitive element and having an electrode surface,
wherein the electrode surface of the second capacitive element is formed on the printed circuit board and is electrically isolated from the first electrode surface of the capacitive element, and
wherein the electrode surface of the second capacitive element and the second electrode surface of the capacitive element form electrodes of the second capacitive element.

15. The battery cell arrangement of claim 13,
wherein a first set of fins is arranged on the first electrode surface of the capacitive element in an interleaved manner with respect to a second set of fins arranged on the second electrode surface of the capacitive element, and
wherein the first set of fins and second set of fins are configured to slide between each other as a result of the pressure within the housing of the battery cell being exerted on the membrane of the housing of the battery cell.

16. The battery cell arrangement of claim 11, wherein the membrane of the housing comprises a metal element, preferably aluminum.

17. The battery cell arrangement of claim 11,
wherein the sensing arrangement further comprises a printed circuit board arranged at a predetermined distance from and adjacent to the membrane of the housing of the battery cell,
wherein the sensing arrangement comprises an inductive element that is arranged on the printed circuit board, and
wherein the sensing arrangement is configured to measure a change of magnetic permeability as a result of the pressure within the housing of the battery cell being exerted on the membrane of the housing of the battery cell.

18. The battery cell arrangement of claim 17, wherein the inductive element comprises a discrete inductor element or a planar inductor element that is printed on the printed circuit board.

19. The battery cell arrangement of claim 11, wherein the membrane of the housing comprises a ferromagnetic element, preferably ferrite.

20. A battery management system comprising:
- a receiving unit configured to receive, from a battery cell arrangement, a signal indicative of an internal pressure of a battery cell, wherein the signal is further indicative of a change of capacitance or inductance of a sensing element arranged adjacent to a membrane of the battery cell arrangement, and
- a processing unit configured to determine a value of the internal pressure of the battery cell based on the signal received from the battery cell arrangement, and to generate a command signal to electrically decouple the battery cell from a load when the value of the internal pressure of the battery cell is greater than or equal to a threshold pressure value.

\* \* \* \* \*